United States Patent [19]
Pickering et al.

[11] 3,909,771
[45] Sept. 30, 1975

[54] OPHTHALMIC B-SCAN APPARATUS

[76] Inventors: Norman C. Pickering, Ferry Rd., North Haven, Sag Harbor, N.Y. 11963; Nathaniel R. Bronson, II, 186 Old Town Rd., Southampton, N.Y. 11968

[22] Filed: Aug. 6, 1973

[21] Appl. No.: 386,213

[52] U.S. Cl................ 340/1 R; 73/67.8 S; 340/3 C; 343/5 CD
[51] Int. Cl............................ G01s 9/66; G01s 7/62
[58] Field of Search............ 340/1 R, 3 R, 3 C, 3 A; 343/5 DP, 5 SC, 5 CD; 73/67.7, 67.8 R, 67.8 S

[56] References Cited
UNITED STATES PATENTS

| | | | |
|---|---|---|---|
| 2,651,012 | 9/1953 | Van Valkenburg et al. | 340/3 A |
| 2,778,002 | 1/1957 | Howry | 340/3 R |
| 3,156,110 | 11/1964 | Clynes | 73/67.8 |
| 3,307,142 | 2/1967 | Doebler | 340/3 R |
| 3,543,269 | 11/1970 | Dudley | 343/5 EM |
| 3,614,720 | 10/1971 | Ludlum | 340/3 R |

*Primary Examiner*—Richard A. Farley
*Attorney, Agent, or Firm*—Leonard H. King

[57] ABSTRACT

This invention relates to an optical display system and more particularly to an improved B-scan ultrasonoscope.

The apparatus may be used for scanning tissue, for example, the human eye and detecting differences in density of various embedded substances and their relative depth and displaying the information pictorially in color.

The aforementioned abstract is neither intended to define the invention of the application which, of course, is measured by the claims, nor is it intended to be limiting as to the scope of the invention in any way.

17 Claims, 7 Drawing Figures

OPHTHALMIC B-SCAN APPARATUS

BACKGROUND OF THE INVENTION

For many years, pulse-echo techniques have been used in medical diagnoses. The conceptual basis of this technique is rooted in the basic work of sonar and radar. In these systems, a pulse of sound is directed underwater or in the air in a beam. When it strikes an object, a portion of the energy is reflected back toward the sender. This is received by a transducer such as a microphone or like structure, and the acoustic energy is converted into electrical energy and amplified. Three pieces of information are therefore provided by the returned echo from the object. First, the fact that there is an echo indicates some obstruction in the path of the sound beam. Second, the intensity of the echo may suggest some of the characteristics of the object. Finally, on the basis of the speed of sound which is known, and the time the sound has taken to travel to the object and returned, which can be measured one can calculate the distance the sound has travelled.

In relating this concept to medical diagnoses, a short burst of ultrasonic energy is directed into soft tissue, and the returning echos contain information about the presence of objects, the relative density of the tissue and axial distances within the body being tested.

The use of ultrasound to examine the eye has been of specific interest since the frequency is exceedingly high and of low intensity, which avoids any damage to the eye or its surrounding area. Other types of energy pulses such as X-ray or infra-red will not be reflected by eye tissue.

When using the pulse-echo technique, the amplitude of the echo returned from the object is related to tissue density and the time of arrival is a measure of distance or depth into the body. Thus, a short pulse of sound is directed into the eye and the echos reflected from the ocular media are examined. For example, the presence of an echo from the mid vitreous, normally an acoustically empty area, could indicate either a blood clot or a foreign body. By examining the intensity of this echo it is possible to distinguish between the two, since a greater proportion of sound energy is returned from a foreign body. On the basis of the time which sound takes to reach the object and return, and the speed of sound in the eye, the distance can be determined.

Repetition of the pulses at a suitable rate creates a nearly continuous signal pattern which can be displayed on a cathode ray tube which may be a TV-type picture tube. As is known in the art, there are two principal methods of presenting the echos on the picture tube which are referred to as A-scan and B-scan. The simplest method is the so-called A-scan technique wherein the transducer generating the pulses is stationary and the echos are displayed as vertical deflections of the CRT tracing. The horizontal deflection is proportional to time and may be calibrated to indicate distance. The pulse stream displayed on the CRT screen therefore represents an irregular "picket fence" with the height of the pickets indicating the strength of the echos and the spacing between pickets showing depth information. In such a display, the brightness of the trace on the tube carries no information.

From this display the presence of an abnormal area in the vitreous of the eye can be detected and it can be determined that it is a solid by the fact echos are returned from the interior of the lesion. At that point at which the sound beam is aimed the depth of the abnormal area can be determined. However, only one such measurement can be taken from an A-scan ultrasonogram and it is difficult to build up a mental three-dimensional picture of the structure from these single measurements. Only by moving the transducer into various positions and in various directions can any idea of the shape and size of a lesion be obtained. Even so, as one is never precisely sure of the area being examined in the posterior of the eye or, even worse, in the orbit, it is often impossible to determine ultrasonically the exact size and shape. In addition, as only one or two sweeps by hand may be made over an area, a small structure is easily missed.

In the B-Scan technique the transducer is moved over the eye automatically, or at times manually, with the position of the vertical trace of the CRT synchronized to follow the direction of the ultrasonic beam. Again the horizontal trace is relative to time and therefore equivalent to distance. However, in the B-scan technique brightness of the spots on the CRT indicates echo strength and therefore the density of the body detected. With this technique, a two dimensional or cross-sectional picture of the anatomical structure being scanned is seen on the CRT screen. It is therefore easier to obtain a picture of the eye, or other body being scanned, and small lesions that would have gone undetected with the A-scan method can be now detected.

Thus, in the B-scan presentation, horizontal distances on the display represent depth, or distance from the transducer; vertical dimensions represent the width of the section being scanned, and intensity or brightness, of the picture at any point is a function of relative tissue density. A full discussion of the B-scan ultrasonoscope as is presently known in the art can be found in the article "Development of a Simple B-scan Ultrasonoscope", by Nathaniel R. Bronson, Transactions of the American Opthalmological Society, Volume 70, 1972.

One of the major problems, however, with present B-scan equipment is that the dynamic range of the television tube or CRT tube is limited to less than 10 to 1 (20db) in brightness, whereas tissue echoes may cover a range of 1,000 to 1 (60db). For this reason, there is generally provided a gain control on the panel of the display tube which is calibrated in 10 db steps and which must be manipulated during examination to obtain the differences in brightness. In using present B-scan equipment, therefore, the user must frequently turn the gain control to its various positions in order to properly read the brightness and determine the tissue density. The user must therefore mentally combine the picture seen with the control setting at various positions in order to obtain a true estimate of tissue density.

Furthermore, any echo which exceeds the brightness range of the display tube will cause "blooming" or a serious degradation in picture sharpness. It is therefore not possible to examine a weakly reflective tissue such as a vitreous hemorrhage, without having the rest of the structures appear as merely solid, fuzzy, bright areas.

In addition to the foregoing, there is a further problem with present scan equipment which causes a poor display on a CRT tube or TV screen. In order to produce the extremely high frequency sound pulse needed for ultrasonic use, a piezo-electric crystal is commonly used as the transducer to convert an electrical driving energy into the sound pulse. The crystal is physically distorted by applying an electrical potential as the drive pulse to the transducer. In driving the ultrasonic transducer of the piezo-electric type with short electric pulses, there is a constant compromise between sensitivity and resolution. Transducers which are lightly damped mechanically have high output signals, but the train of waves after the "main bang" obscures detail in the echoes. On the other hand, high damping gives shorter echo pulses, but the resulting low output creates signal to noise ratio problems. Most B-scan equipment use transducers which are lightly damped in order to obtain the necessary high output signal. However, as a result, the presentation of the echo response on the CRT picture tube produces a broad spot with poor definition.

It is therefore an object of the present invention to provide an improved B-scan ultrasonoscope which avoids the aforementioned problems of prior art devices.

A further object of the present invention is to provide a new digital signal processing apparatus for an ultrasonic B-scan with color display.

Still a further object of the present invention is to provide an improved circuit for pulsing an ultrasonic transducer.

Yet a further object of the present invention is to provide a B-scan ultrasonoscope which achieves a wide dynamic range for ultrasonic visualization of tissue.

A further object of the present invention is to provide an improved B-scan ultrasonoscope which uses a TV color picture tube for presentation of the display.

Still another object of the present invention is to provide a digital signal processing apparatus for use with an ultrasonic B-scan which has a digital output for use with standard data processing equipment.

A further object of the present invention is to provide an improved B-scan ultrasonoscope which makes the most efficient use of the display tube.

These and other objects, features and advantages of the invention will, in part, be pointed out with particularity and will, in part, become obvious from the following more detailed description of the invention, taken in conjunction with the accompanying drawings, which form an integral part thereof.

SUMMARY OF THE INVENTION

In a preferred embodiment of the present invention signal processing apparatus is interposed between the signals received by the transducer and the display device. The train of echoes from the scanning transducer is converted from an analog scale to a digital scale. The digital scale is then divided up to groups of steps wherein each of the incoming pulses fall into one of the groups depending on its relative height. Three groups of steps are ultimately taken and applied to the three guns of a color TV display. Thus, one group is directed to the blue gun, the next group to the green gun, and the third group to the red gun. Any signal which may be stronger than the highest level on each gun will not produce any increase in brightness and will therefore not "bloom" the picture. In such a display, the definition is greatly improved. There is clear separation of tissue by density wherein different colors represent the different densities, and a needle sharp image is produced because of the impossibility of overdriving the color guns. The level steps can be chosen to give equal brightness differences, and the dynamic range tailored to the requirements of specific anatomical structures. Consequently, normal tissue will always fall into a certain color range while abnormalities, such as foreign bodies in the eye, will always be differentiated.

The digitized signal can also be fed into digital data processing equipment for storing, recording, or for print-out in order to have a further processed output.

In another embodiment of the present invention, the pulse generator used to trigger the piezo-electric transducer is arranged to provide a second drive pulse to the transducer just when the free oscillations of the transducer are in the second positive swing. This effectively chokes the oscillations abruptly reducing the amplitude of the ringing pulses. The echoes therefore respond in a shorter period of time, thereby producing discrete figures on the screen without blurring.

BRIEF DESCRIPTION OF THE FIGURES

In the accompanying drawing, like reference characters designate like parts.

In the drawings.

DESCRIPTION OF THE INVENTION

Figure 1:
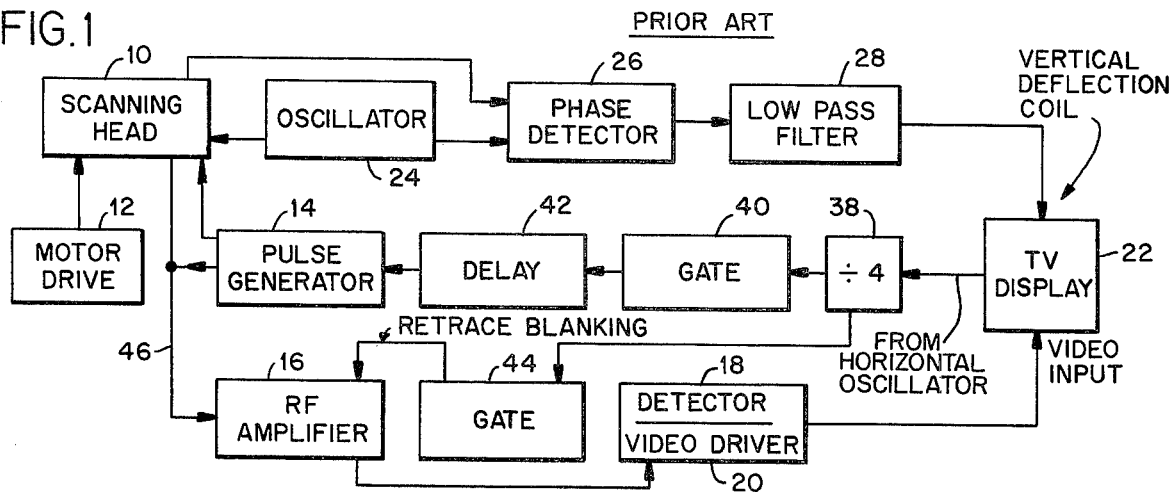
FIG. 1 represents a block diagram of a B-scan ultrasonoscope as is known in the prior art.

In order to understand the use of the present invention, it is necessary to briefly describe a B-scan ultrasonoscope as it is presently known in the art. Referring now to FIG. 1, there is shown a scanning head 10 which contains the piezo-electric transducer which is moved back and forth across a window in the scanner by means of a motor drive 12. The transducer is caused to transmit an acoustic pulse by placing a sudden electric potential across two faces of the transducer. The electric potential is provided by means of pulse generator 14.

When an echo is returned from a body, it is again detected by the transducer in the scanning head 10 and the electrical pulse produced by the transducer is sent to RF amplifier 16. After going through the amplifier 16 the signal is demodulated by detector 18 to suppress the individual RF cycles and convert the information to a video signal for further amplification. After demodulation, the video section amplifies the echo and by means of the video driver 20 applies the input to the TV display 22.

Oscillator 24 is used as the master clock controlling the scanning rate of the transducer in scanning head 10, as well as synchronizing the horizontal movement of the scanning head with the vertical sweep of the TV display. The output from oscillator 24 passes through the phase detector 26 and low pass filter 28 to set the proper sweep rate on the vertical deflection coils of the TV display 22. A horizontal oscillator is included in the TV display. The output from the horizontal oscillator passes through a divide by 4 logic circuit 38 and is gated through gate 40 to trigger the transmitted pulse from pulse generator 14 to the transducer with a variable delay network 42 serving as the depth control. The unused horizontal sweeps were blanked by gating circuit 44 which was also controlled by the divide by 4 network 38 and applied to the RF amplifier 16.

As described heretofore, since the dynamic range of the TV display is limited, while the tissue echoes cover a much broader range, a gain control must be placed on the panel of the TV display which must be manipulated during examination. This makes viewing of the picture difficult since relative densities cannot be easily determined. Furthermore, any echo which exceeds the brightness range of the display will cause blooming and a serious degradation of picture sharpness.

Figure 2:
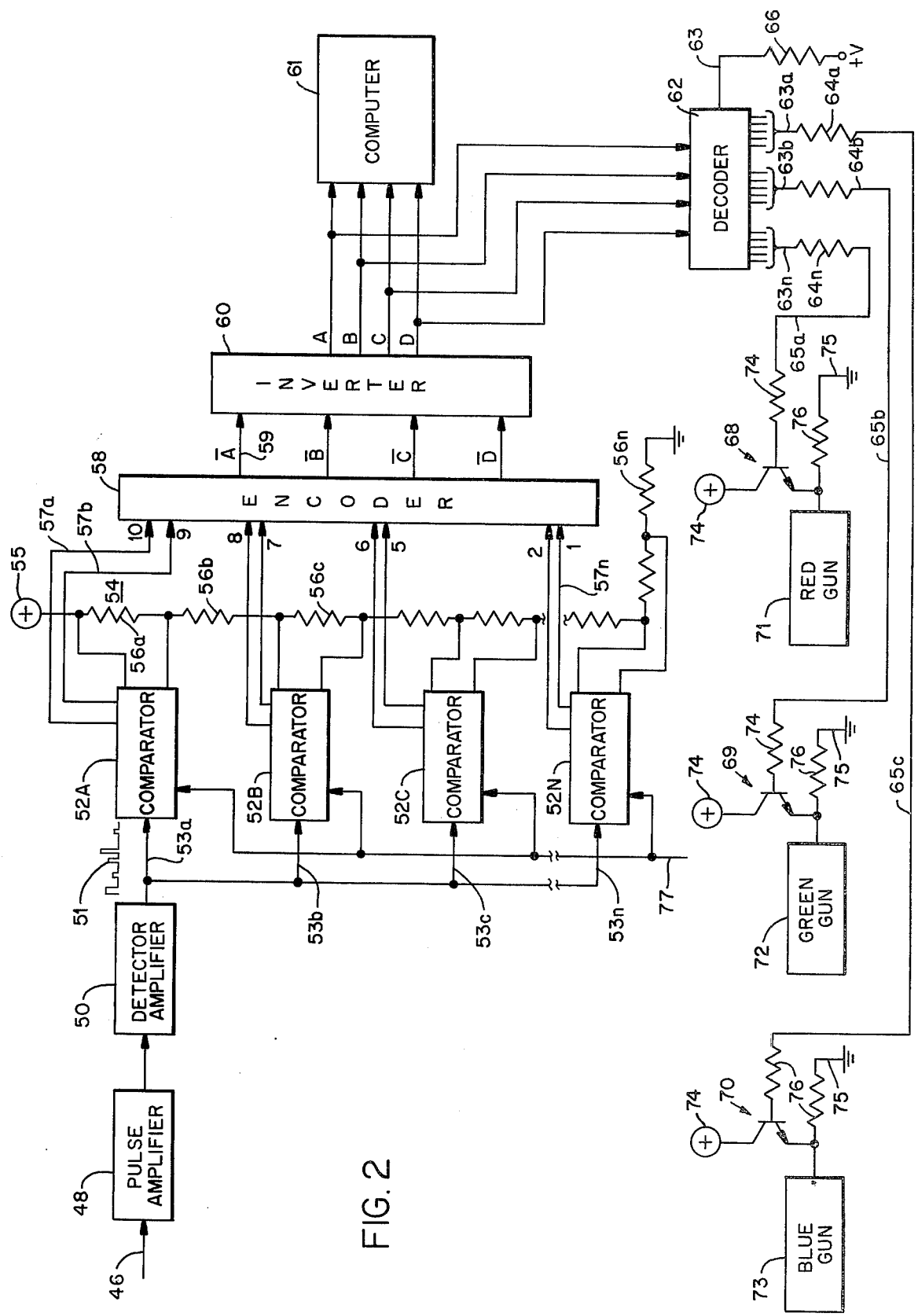
FIG. 2 shows the signal processing equipment for use in a B-scan ultrasonoscope in accordance with one embodiment to the present invention.

To avoid the aforementioned problem, the output from the scanning head on line 46 is fed into the circuit shown in FIG. 2. The analog pulse information passes through pulse amplifier 48 which drives the detector amplifier 50. This produces a train of pulses, the amplitudes of which represent tissue echoes by degree of ultrasonic reflectivity, and the spacing in time of which represent distances inside the anatomy being scanned. These pulses are shown typically at 51.

These pulses are applied to a bank of high speed comparators 52a, 52b, 52c . . . 52n. The number of comparators used can be predetermined and can be as many as desired. Normally, a decimal system would be used and a total of five comparators, each providing two outputs would be used.

The train of pulses serve as input to the comparator along lines 53a, 53b, 53c . . . 53n. The other inputs to the comparators are supplied from a resistance voltage divider showing generally at 54 which is fed from a well regulated standard voltage supply 55. The resistance voltage divider 54 comprises a string of individual series resistors 56a, 56b, 56c . . . 56n. The resistance values are fixed such that the resistance value of 56a is greater than that of 56b which is greater than that of 56c etc. In this manner, an increasing step-wise comparison can be had. When a pulse is applied to the comparator, all comparators below the actual peak level of the pulse will trigger, while those above the peak level will not trigger. The output from the comparators are taken along line 57a, 57b, 57c, 57d . . . 57n. For the example give, using 10 steps, the output on line 57a would represent the highest step of 10, the output on line 57b would represent the step 9, and the output would work itself down until the output on line 57n would represent the value 1.

The outputs from the comparators are applied to encoder 58 for converting a serial code of step values into a binary coded decimal, 1248 code. In the embodiment shown in FIG. 2, the conversion is accomplished by using a priority encoder 58 which provides an inverted code output on line 59 which is then reinverted by the inverter 60 to provide an output on the four transmission lines ABCD. At this point, amplitude data is available in a form which can be read by any standard computer, shown generally at 61, or other data handling equipment. In this manner the information can be recorded in a binary coded decimal form or it can be stored for each sweep in a shift register and compared with successive lines to thereby eliminate or greatly reduce noise. The information can also be used for further computations as is known in the art.

For display purposes, the four lines ABCD, are applied to the binary coded decimal-to-decimal decoder 62. This device converts the data back to an N-line code. The outputs of the decoder in groups feed a set of parallel lines 63a, 63b, 63c . . . 63n each containing a respective series resistor 64a, 64b . . . 64n. The decoder is energized through a dropping resistor 66 connected to a positive supply voltage 67. The resistance values are set such that resistor 64a is less than 64b which in turn is less than that of 64n. In this manner, the lines at the output of the decoder 62 each represent a step value, similar to the values at the output of the comparator. Thus, line 63a would represent the lowest value, line 63b represents the next increasing value and line 63n represents the highest step value. However, by fixing the values of the resistors at a predetermined amount, the steps at the output of the decoder 62 on line 65a, 65b, 65c can be fixed as either a linear step increment, a logarithmic increment, a semilog increment or other function. This is exceedingly important since it permits tailoring of the output voltages to fit the voltage brightness curve of the display tube. The output on lines 65a–65c for each of the binary coded decimal inputs to the decoder 62 from lines ABCD, will produce a voltage $V_1$ whose value will be presented by the following formula:

$$V_1 = V_{67} \left( \frac{R_{64}}{R_{64} + R_{66}} \right)$$

Wherein V67 represents the voltage 67, R64 represents one of the resistors 64a, 64b . . . 64n and R66 represents the fixed resistor 66 connected to the voltage source 67. The output voltages along line 65 will therefore vary in accordance with the steps preset by the resistors 64. The output voltage feeds three amplifiers 68, 69, 70 each of which control respectively one of the three color guns of the CRT, namely the red gun 71, green gun 72 and blue gun 73. Resistors 74, 75, 76 contained at the input to each of the amplifiers controls the operation of the amplifiers whereby the signals are divided such that the lowest steps are applied to the blue gun, the middle steps are applied to the green gun and the highest steps are applied to the red gun.

Each of the amplifiers 68, 69 and 70 comprise a transistor having the signal fed into the base, the collector connected to a positive voltage source 74, and the emitter grounded at 75 through a resistor 76. The output feeds the appropriate color gun of the CRT and is taken from the emitter.

Although a single decoder with three amplifiers whose operation is controlled, have been shown, it is understood that a separate decoder with a single output amplifier could be provided for each color gun of the CRT. By proper wiring of the decoder, the lowest steps of the comparator screen are thereby applied to the blue gun, the middle steps to the green gun, and the highest steps to the red gun.

Because of the comparator technique as shown in FIG. 2, overdriving of the CRT is impossible. When the highest comparator is triggered, the spot goes to maximum brightness and no more. On a normal display, increased voltage would cause broadening of the spot and degradation of image sharpness.

By applying a strobe input to the comparators on line 77, it is possible to clock the amplitude information. This, then, relates the amplitude information in binary coded decimal code to the instantaneous position of the spot in fractions of a microsecond. This can result in several advantages, the greatest of which is noise reduction by averaging two or more successive scans. Once the digitized amplitude information is horizontally digitized into time bits by means of a strobe, it can be stored for each sweep as a 4 level code in four simultaneously clocked shift registers contained in the computer 61. Then, successive lines can be compared to eliminate and greatly reduce the noise.

For normal black and white picture tube the dynamic range and brightness is 20 db whereas the tissue echoes may cover a range of 60 db. By using the circuitry as shown in FIG. 2, and using for example 15 steps in the comparator 52, each step can be spaced to indicate 4 db per step, giving the total coverage of the 60 db required for complete dynamic range coverage. In doing so, of the 15 steps required, the lowest five steps would be directed to the blue gun, the next five steps to the green gun, and the strongest five steps to the red gun. It is assumed that a three-gun tube is employed although a single gun multi-phosphor display may be used.

Although numerous values can be used for the resistors of the comparator string 54 and for the resistors at the output of decoder 62, the following values have been used in one embodiment and are presented here to show a workable embodiment of the present invention but in no way is the invention limited thereto.

Resistances of the string 56a, 56b ... 56n are respectively 220Ω, 150Ω, 120Ω, 100Ω, 82Ω, 68Ω, 51Ω, 39Ω, 33Ω and 120Ω. The voltage 55 is 4.62V.

Resistances of the group 64a, 64b ... 64n are respectively 22Ω, 47Ω, 82Ω, 120Ω, 150Ω, 220Ω, 330Ω, 470Ω, and 680Ω. Resistor 66 is 220Ω and voltage 67 is 12V.

In order to further improve the picture displayed on the screen, it is helpful to eliminate the ringing effect of the transducer pulse thereby providing clear definition of the spots and lines on the TV or CRT tube. As heretofore explained, generally a piezo-electric transducer is used as for example, generally a lead metaniobate transducer with a nominal resonant frequency of 10 megahertz. The transducer, to first approximation, is a mechanically resonant system with a single degree of freedom so that when shock excited, it will execute free vibrations at its principal resonant frequency. The rate at which the free vibrations die away is an exponential function of time as well as a function of the Q of the circuit comprising the transducer and its drive elements. The shock excitation to the transducer consists of a short negative pulse of voltage applied to the transducer element and having a duration approximately equal to half a period of natural oscillation. For example, the lead metaniobate transducer would require a shock excitation of approximately 50 nanoseconds. This pulse causes the ceramic element to shorten, storing a charge of mechanical potential energy in its stiffness. With the driving pulse removed just as the mass is about to move outward under the influence of stored spring energy, the transducer extends its length to complete the cycle of oscillation. At the point of maximum extension, the kinetic energy in the mass has produced a stress in the ceramic element which acts upon the mass to reverse its direction of motion and initiates another cycle of oscillation. This action continues until the energy in the circuit is dissipated.

Figure 4:
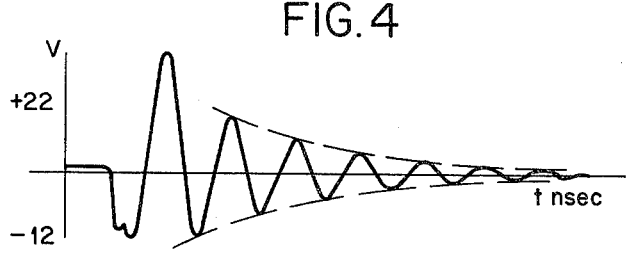
FIGS. 4–7 represent graphs, useful for explaining the improvements caused by the circuit shown in FIG. 3.

FIG. 4 is a graph representing an oscillogram of the action just described. For the lead metaniobate transducer described, the negative pulse of approximately 12 volts, 60 nanoseconds long, initiates the action. The positive swing of 22 volts occurs as the oscillatory reaction to the initial disturbance. After the first cycle, the oscillations settle down to a classical pattern of damped free vibrations. The frequency of this particular transducer is approximately 8.3 megahertz. Typically frequencies in the range of 1 to 20 megahertz may be employed. The logarithmic decrement is approximately 0.645, after the initial nonlinerarty.

Figure 5:
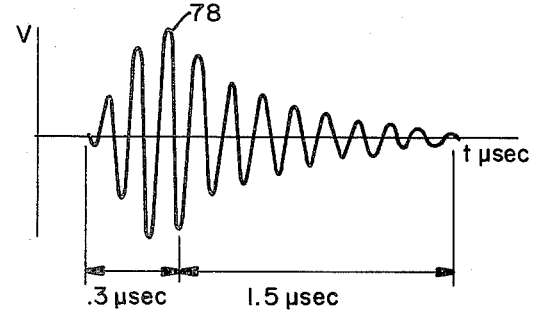

The long ringing of the transducer produces an echo such as is shown in FIG. 5. It is noted that the third cycle indicated at 78, has reached the maximum amplitude and that there are approximately 12 more complete cycles visible in the trace. Presentation of such a response on the CRT picture tube, or TV tube produces a broad spot with poor definition.

Figure 6:
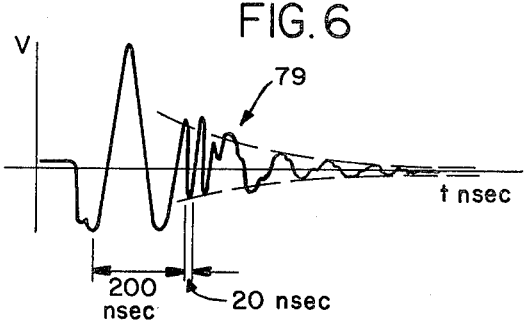

If, however, a second drive pulse is applied to the transducer just when the free oscillations are in the second positive swing, the motion will be effectively choked, abruptly reducing the amplitude of ringing. This is shown in FIG. 6 in which a 20 nanosecond negative pulse was applied to the transducer 220 nanoseconds after the beginning of the main trigger pulse. There is noted a negative notch indicated at 79, where there was a large positive swing previously in FIG. 4.

It is recognized that higher harmonics are produced by the damping pulse, but the fundamental energy is sharply attenuated. Although the logarithmic decrement is unchanged, the amplitude reduction has effectively telescoped the time-scale of the ringing.

An improvement in attenuation of the transducer ringing was most evident. In the example given as shown in FIG. 4 the maximum peak to peak voltage at the initial positive swing was 37 volts. After 0.7 microseconds the ringing was reduced to 4 volts, or a reduction of 19.3 db. In the diagram of FIG. 6, using the second drive pulse as heretofore described, again the maximum peak to peak amplitude of the initial swing was 37 volts. However, after only 0.6 microseconds the ringing pulse was less than 1 volt, which was a reduction of more than 31.4 db.

The effect on the echo is, however, the most important result of this embodiment of the invention. FIG. 5 had shown the echo resulting from the transducer pulse of the prior art devices. The Q of the transducer effects its response to receive ultrasonic energy. In the particular device used, by way of example, there was required approximately 3 cycles before the maximum amplitude of the echo was reached. The echo then rings for about 12 more cycles before reaching a negligible amplitude. From the start to the maximum amplitude required approximately 0.3 microseconds. The ringing required approximately 1.5 microseconds. The total time of the ehco was therefore about 1.8 microseconds, which represents a distance of about 2.7 millimeters in tissue. The time until the ringing was reduced to 6 db attenuation was 0.24 microseconds. The time to 12 db attenuation was 0.60 microseconds, and the time until −20db was 1.0 microseconds. This means, that a structure of infinitesmal axial length would be rendered on the display tube (having a 20 db dyanmic range) as a spot increasing in brightness for about 0.45 millimeters and decreasing in brightness for about 1.5 millimeters for a total apparent distance of about 2 millimeters. This would constitute the limit of axial resolution for discrete objects and is noted to be quite poor.

Figure 7:
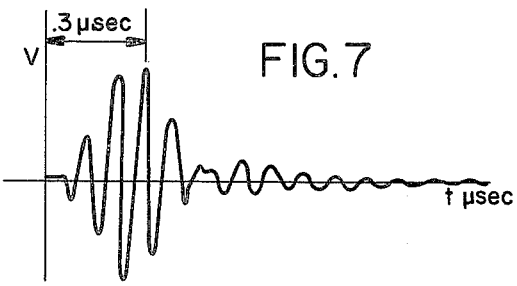

Referring now to FIG. 7 there is shown the echo trace from the improved pulsing in accordance with this invention. It is noted that it still required approximately 0.3 microseconds for the echo to reach its maximum at the third cycle since this is a function of the receiving Q of the device. However, the amplitude drops off rapidly thereafter being 6 db down at 0.12 microseconds, −12 db at 0.2 microseconds, and −20 db at 0.6 microseconds. Thus the image of an abrupt acoustical discontinuity would be a spot increasing in brightness for 0.45 millimeters and decreasing at about the same rate. Therefore, resolution would be about 1 millimeter axially, representing a 2 to 1 improvement over that of prior art devices.

Figure 3:
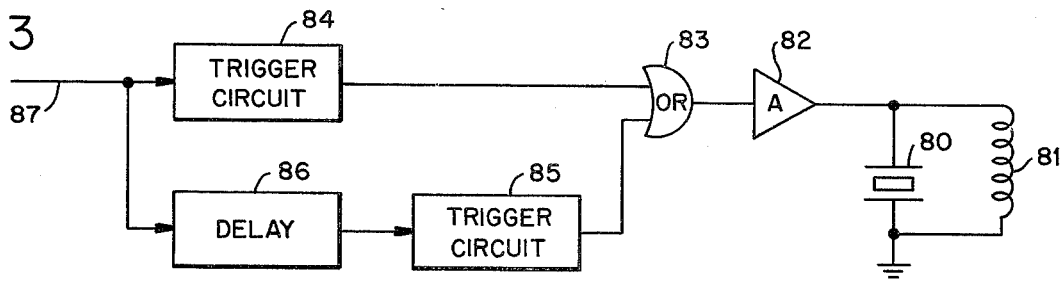
FIG. 3 shows a block diagram of a pulsing circuit for an ultrasonic transducer in a B-scan ultrasonoscope in accordance with another embodiment of the present invention.

The circuit used to provide the second pulse to the transducer is typically shown in FIG. 3. The piezoelectric transducer crystal 80 with its associated inductance 81 is shown driven from a power amplifier 82 which obtains its drive from an OR gate 83. The gate 83 has two inputs one directly from a trigger circuit 84 and the other from a second trigger circuit 85 which is delayed by delay 86 preceding it. For the example described heretofore with regard to the lead metoniobate transducer, the trigger circuit 84 could comprise a 60 nanosecond one shot multivibrator; the trigger circuit 85 could comprise a 20 nanosecond one shot multivibrator, and the delay 86 could be a 220 nanosecond one shot multivibrator. It is understood, that all of the times are adjustable to match the characteristics of the associated transducer.

The input on line 87 would be the start pulse provided by the clocks to the trigger circuit. The trigger circuits and the delay would all comprise the pulse generator described with regard to FIG. 1.

There has heretofore been described an improved circuit for a B-scan ultrasonoscope using a new digital signal processing apparatus converting the analog signals to a series of step pulses which are applied to the three color guns of a TV display or CRT tube to provide the entire dynamic range of the tissues on a single display without the necessity for switching controls and without danger of "blooming" the picture. Furthermore, the approach makes it possible to correct for the non linear relationship between input signal strength and apparent brightness of the image. The digital signals are also available for computer and data processing use. In another embodiment of the invention, the picture on the display is further delineated by providing an improved circuit for pulsing the ultrasonic transducer by using a second drive pulse to effectively choke the ringing amplitude of the transducer output thereby similarly reducing the ringing of the echo pulse to improve the resolution on the TV or CRT display.

It is to be understood that while the apparatus has been described in terms of a three-gun system, a two color display or a three-color display tube of the single gun type may be employed.

While the above described circuits have been with respect to the use of the ultrasonoscope with eye tissue, it is understood that the concepts could as well be used for other anatomical portions without necessarily changing any of the concepts of the invention.

There has been disclosed heretofore the best embodiments of the invention presently contemplated. However, it is to be understood that various changes and modifications may be made thereto without departing from the spirit of the invention.

What we claim as new and desire to secure by Letters Patent is:

1. A B-scan ultrasonoscope comprising:
   scanning head means having an output portion;
   transducer means contained within said scanning head means for providing an acoustic output signal when triggered with and electric input signal and for producing an electric output signal upon receiving an echo pulse input caused by a body reflecting the acoustic signal;
   motor drive means for moving said transducer means across said output portion of said scanning head means;
   pulse generator means electrically coupled to said transducer means for providing the electrical input to the transducer means;
   display means including vertical deflection control means, horizontal deflection control means, and a plurality of color gun means;
   clock means coupled to said scanning means and to said vertical deflection control means for synchronization of the vertical deflection on said display means with the movement of said transducer across said output portion of said scanning head means;
   amplifier means receiving the electrical output signal from said transducer means;
   detector means converting the output from said amplifier means into a series of input pulses whose amplitude represents the intensity of the echo pulses and whose spacing in time represents distance from the reflecting body to said scanning head means;
   conversion means for converting said series of input pulses into a corresponding series of digital signals whose values represent incremental steps of a predetermined continuous functional relationship with said series of input pulses;
   encoding means for converting said series of digital signals into binary coded decimal values;
   decoding means for converting said binary coded decimal values into a series of signals whose values represent incremental steps of another predetermined continuous functional relationship with said series of input pulses;
   means coupling the signals of each of said last mentioned incremental steps to respective ones of said color guns; and
   gating means responsive to said clock means for controlling the horizontal deflection control means, whereby horizontal distances on the display means represent distances from said scanning head means.

2. An ultrasonoscope as in claim 1 wherein said conversion means comprises, a comparison means receiving said series of pulses and comparing the amplitude of each of the pulses with a sequence of reference inputs forming a continuous sequence of predetermined incremental steps, said comparison means producing for each pulse an output signal indicating the number of steps which said pulse covers.

3. An ultrasonoscope as in claim 2 wherein the continuous sequence of predetermined incremental steps is provided by a voltage divider having a plurality of outputs at predetermined tapped locations, each of said outputs being one of the fractions of a reference input to said comparison means, and voltage source means connected across the voltage divider.

4. An ultrasonoscope as in claim 3 wherein the locations of said tapped outputs form said predetermined continuous functional relationship and wherein said functional relationship is a linear one.

5. An ultrasonoscope as in claim 3 wherein the locations of said tapped outputs form said predetermined continuous functional relationship and wherein said functional relationship is a logarithmic one.

6. An ultrasonoscope as in claim 3 wherein the locations of said tapped outputs form said predetermined continuous functional relationship and wherein at least one of said functional relationships correspond to the voltage-brightness curve of the display means.

7. An ultrasonoscope as in claim 1 wherein said decoding means comprise a decoder having a plurality of outputs, a plurality of incremental resistance means each connected respectively in series with said decoder outputs, and amplifier means receiving the outputs from said decoder and applying them to said coupling means.

8. An ultrasonoscope as in claim 1 wherein said encoding means comprises a priority encoder providing inverted binary coded decimal values, and inversion means changing said inverted binary coded decimal values into positive binary coded decimal values.

9. An ultrasonoscope as in claim 7 wherein the incremental relationship between said resistance means is a linear one.

10. An ultrasonoscope as in claim 7 wherein the incremental relationship between said resistance means is a logarithmic one.

11. An ultrasonoscope as in claim 7 and wherein the incremental relationship between said resistance means corresponds to the voltage-brightness curve of the display means.

12. An ultrasonoscope as in claim 1 and further comprising computer means receiving said binary coded decimal values and storing them for further computation, said computer means including separate shift registers for each of the four digits of the binary coded decimal values, said shift registers storing the values for each sweep of the transducer, and comparison means for comparing in each of said shift registers the successive sweeps of the transducer.

13. An ultrasonoscope as in claim 1 wherein said plurality of color guns include a blue gun, a green gun, and a red gun and wherein said coupling means directs the lowest group of said digital signals to said blue gun, the next group to said green gun and the highest group to said red gun.

14. An ultrasonoscope as in claim 1 wherein said transducer is of the piezo-electric type producing an oscillating output and wherein said pulse generator means comprises first trigger means providing a first pulse output, delay means and, second trigger means in series with said delay means, the series combination providing a second pulse output delayed in time from said first pulse output, said first and second pulse outputs being applied to trigger said piezo-electric transducer, and wherein said second pulse output occurs when the oscillations are in the second positive swing.

15. A signal processing apparatus for a B-scan ultrasonoscope having transducer means for transmitting an acoustic energy pulse and receiving a reflected echo and in response to the said echo producing an electric output signal and display tube means for displaying the echo signals received, said signal processing apparatus comprising detection means converting the output from said transducer means into a series of input pulses whose amplitude represents the intensity of the echo pulse and whose spacing in time represent distance from the transducer to the reflecting body, conversion means for converting said series of input pulses into a corresponding series of digital signals whose values represent incremental steps of a predetermined continuous functional relationship with said series of input pulses, encoding means for converting said series of digital signals into binary coded decimal values, decoding means for converting said binary coded decimal values into a series of signals whose values represent incremental steps of another predetermined continuous functional relationship with said series of input pulses said display tube means including a plurality of color presentation means, and means coupling the signals of each of said last mentioned incremental steps to respective ones of said color presentation means.

16. Signal processing apparatus as in claim 15 and wherein said conversion means comprises comparsion means receiving said series of pulses and comparing the amplitude of each of the pulses with a sequence of reference inputs forming a continuous sequence of predetermined incremental steps, said comparison means producing for each pulse an output signal indicating the number of steps which said pulse covers.

17. Signal processing apparatus as in claim 16 and wherein said sequence of predetermined incremental steps form said predetermined continuous functional relationship and wherein at least one of said functional relationships correspond to the voltage-brightness curve of the display tube means.

* * * * *